United States Patent [19]
Banerjee

[11] Patent Number: 6,091,804
[45] Date of Patent: *Jul. 18, 2000

[54] DEVICE USEFUL AS A MASTER/SLAVE CLOCK FOR TRANSMITTING STANDARD TIME OVER A TELEPHONE NETWORK AND A TELEPHONE NETWORK INCORPORATING THE DEVICE FOR TRANSMITTING AND RECEIVING STANDARD TIME

[75] Inventor: Parameswar Banerjee, New Delhi, India

[73] Assignee: Council of Scienntific & Industrial Research, New Delhi, India

[*] Notice: This patent issued on a continued prosecution application filed under 37 CFR 1.53(d), and is subject to the twenty year patent term provisions of 35 U.S.C. 154(a)(2).

[21] Appl. No.: 08/772,689

[22] Filed: Dec. 23, 1996

[30] Foreign Application Priority Data

Dec. 29, 1995 [IN] India ............................... 2472/DEL/95

[51] Int. Cl.$^7$ .............................. H04M 11/00; H04L 7/00
[52] U.S. Cl. ......................................... 379/93.01; 375/355
[58] Field of Search ............................... 379/92.03, 92.04, 379/93.01, 93.07, 93.17, 112; 375/223, 355–357, 373, 375, 376; 395/200.3, 200.5, 680; 340/825.3, 825.54, 825.58, 825.55, 825.57; 346/80, 82

[56] References Cited

U.S. PATENT DOCUMENTS

| | | | |
|---|---|---|---|
| 3,764,913 | 10/1973 | Ochel et al. | 375/223 |
| 4,125,993 | 11/1978 | Emile, Jr. | 379/93.17 |
| 4,337,463 | 6/1982 | Vangen | 340/825.3 |
| 4,358,777 | 11/1982 | Bille | 346/82 |
| 4,580,011 | 4/1986 | Glaser | 379/112 |
| 5,329,559 | 7/1994 | Wong et al. | 375/373 |

FOREIGN PATENT DOCUMENTS 2100633   7/1993   Canada ........................... G04C 11/04

Primary Examiner—Curtis A. Kuntz
Assistant Examiner—George Eng
Attorney, Agent, or Firm—Abelman, Frayne & Schwab

[57] ABSTRACT

A device capable of transmitting or receiving time data in the master clock or slave clock modes respectively over standard telephone networks is a microprocessor based system with an independent clock and a time display unit. In the slave clock mode, the device can automatically dial the master clock to have its time corrected.

6 Claims, 4 Drawing Sheets

DEVICE USEFUL AS A MASTER/SLAVE CLOCK FOR TRANSMITTING STANDARD TIME OVER A TELEPHONE NETWORK AND A TELEPHONE NETWORK INCORPORATING THE DEVICE FOR TRANSMITTING AND RECEIVING STANDARD TIME

BACKGROUND OF THE INVENTION

1. Field of the Invention

This invention relates to a device useful as a master slave clock for transmitting standard time over a telephone network and a telephone network incorporating the device for transmitting and receiving standard time.

2. Description of the Related Art

The requirement of very precise time (of the order of millisecond, microsecond, nanosecond etc.) is limited to users engaged in research in basic science, astronomical studies, space mission, defence activities, etc. But other than these, most users who are interested in time up to one second accuracy would be interested for such service. Number of such users are many including organizations like Railway Station, Airport, some Supermarkets, some government organizations etc. which arrange public display system for time.

Time is one of the several basic quantities from which most physical measurement systems are derived. Others are length, mass and temperature. Unlike other physical quantities it cannot be apprehended by any of the physical senses. For example, we can see distance, feel weight or temperature. But we can know time only through consciousness or observing effects.

When we talk of 'time' it may have two meanings: (i) time interval and (ii) time instant. Therefore, the word time requires some additional terms for clarifications. The first one, (i.e. the time interval) is the duration between two events, or in other words, it is the length of time between two events. Time interval may or may not be associated with a specific data. It is of vital importance for synchronization, the very basic need for efficient communication.

The second one, the instant of time, specifies the particular time at which an event has occurred or will occur. Time of a day or date is the most often used term. It is usually presented in a brief form of hour, minute and second, whereas a complete statement of time should also include week, day, month and year. It could also extend to units of smaller than the second going down through milliseconds, microseconds, nanoseconds and picoseconds. We can define time as a continuum that lacks spatial dimensions and in which events occur through irreversible succession from past to future through present.

Accurate and precise means for time information traceable to national and international standards have assumed great importance in recent times. This is due to the demanding uses in various fields. Dissemination means interconnections between the source and the user of time signal. This is like a bridge to make connection between them. Hence to make time accessible to the users the need for time dissemination emerges. There are different types of users depending on the accuracy desired by them. The accuracy desired by them may be of the order of nanoseconds, picoseconds, microseconds, milliseconds and seconds. As the requirement of the order of time accuracy increases the system becomes more complicated and at the same time the cost of the system also increases. The system which can provide highest order of accuracy obviously can serve the purpose of the users requiring lesser order of accuracy. But the use of such a system for the purpose where lower order of accuracy is desired would unnecessarily complicate the system and at the same time the system would be very expensive which is quite undesirable. So, there are several methods of time dissemination having their relative merits and demerits depending mainly on its accuracy, coverage, reliability, ease of use and cost etc. Basic methods of Standard Time and Frequency Signal (STFS) dissemination may be broadly classified into following categories:

Portable Clocks

It is the most accurate and reliable method of time transfer from the time keeping laboratory to the remote user. In this method a portable clock is synchronized at a reference station and carried to desired place in running condition for comparison. To synchronize a remote clock it becomes imperative to fly the clock to reduce travel time. Thus, this method is expensive and is available on demand. This method is accurate to some tens of nanoseconds.

Radio Communication

It is the most important method of STFS dissemination. This dissemination technique is used for comparison of remote clock through radio signal. Previous methods are basically meant for point to point communication. But the radio technique has the primary provision of many users' accessibility simultaneously. The radio communication involves ionospheric propagation up to frequencies of 30 MHz. If the frequency exceeds 30 MHz, the wave propagates in almost a straight line. This is called line of sight propagation (LOS) and forms the basic feature of TV and satellite systems. The satellites are more advantageous than the terrestrial STFS dissemination techniques in terms of global coverage, accuracy of time transfer and propagation feature. Radio communication can be classified as:

A. High Frequency System

B. Very Low Frequency System

C. Satellite System: There are two main categories of STFS dissemination through satellites, e.g.

(a) Geostationary satellites: Geostationary Satellites are normally used to reflect the time signals. There are two basic techniques of time transfer via Geostationary satellite:

(i) One way technique: There are two operational STFS dissemination services in one way mode—one via INSAT originated from National Physical Laboratory, India (A. Sen Gupta, A. K. Hanjura and B. S. Mathur (1991) Satellite broadcasting of time and frequency signals Proc. IEEE, 79, 973) and the other is via GOES satellite originated from NIST, Boulder, USA (R. E. Beehler, D. D. Davis and J. B. Milton, GOES satellite time code dissemination Description and operation, NBS Special Publication 250–300, Jan 1998). The time service via INSAT has the time accuracy capability of ten microseconds.

(ii) Two way technique: Two way technique using MITREX modem has been used for experimental purposes many times to synchronize/compare phasing of seconds pulses of clocks remotely located. This technique amply showed the capability of time comparison accuracy of the order of tens of nanoseconds.

(b) GPS System: Global Positioning System (GPS) (P. Banerjee et. al. (1994) Monitoring of GPS signals at NPL, New Delhi for precise time comparison, IJRSP, 23, 246) is the most accurate world wide time service. This has the capability of few hundred nanoseconds time at any time everywhere.

Wire Communication

Wire communication means to transmit clock time through wire cables. These are used for driving different clock display systems from one central clock for in-house applications. There are two types of wire communication:

Parallel Bit Communication

In this form of wire communication one should dedicate one line for each bit of information, thus requiring N lines for N bits. This is the major disadvantage in parallel communication. Thus dissemination of time signals in parallel form is rather inconvenient for longer distance. But circuit for display system is simple and faster.

Serial Bit Communication

In this case of serial cables there is a pair of wires instead of parallel wires. So bits related to current time data is transmitted sequentially (i.e. one bit at a time is transmitted). This is a slow process and is used in fields where speed is not an important factor. Here the circuit is more involved and thereby it involves more cost. But this is convenient for longer network. These techniques might have been used for local applications but no regular time service using these techniques has been reported yet now.

Most of the available services give time accurate to the order of milliseconds, microseconds submicroseconds etc., thereby making it economically nonviable for large number of users' requirement. None of the above mentioned service can serve the requirement of Standard Time display with a very simple and inexpensive means. The Patent-Search has been conducted to survey the existing patents relating the use of time transfer using telephone network. The critical study of the prior patents indicates that none of them is, somehow, not at all connected to the type of applications the present invention is intended to. A new service which is being planned to be launched by the applicant would be a service through which users would be accessed to Standard Time up to one second accuracy with a very simple equipment connected to normal P&T telephone line. This service would be the first of its kind and would be known as TELECLOCK SERVICE.

SUMMARY OF THE INVENTION

The main object of the present invention is to provide a device useful as a master/slave clock for transmitting standard time over a telephone network. Another object is to provide a telephone network incorporating the device for transmitting and receiving standard time.

In the present invention, synchronization of time is being done through telephone lines. Here digital data is being generated from a standard clock and is transferred through a telephone line. Users may get their clock synchronized to Indian Standard Time (IST) by dialing the number of the dedicated telephone line. Teleclock has its own independent clock based on a good crystal oscillator, which is sufficient to maintain time within one second for a day or two. It has its own automatic dialling system too. It can dial the number and get its clock synchronized to the data transmitted by NPL through a telephone line within few seconds. The clock of the user will then run from its new time automatically as soon as the telephone line is disconnected. The phase of second pulse or one pulse per second (1 pps) of the local clock will also be set within few tens of millisecond if we ignore the propagation delay.

DESCRIPTION OF THE PREFERRED EMBODIMENT(S)

Figure 1:
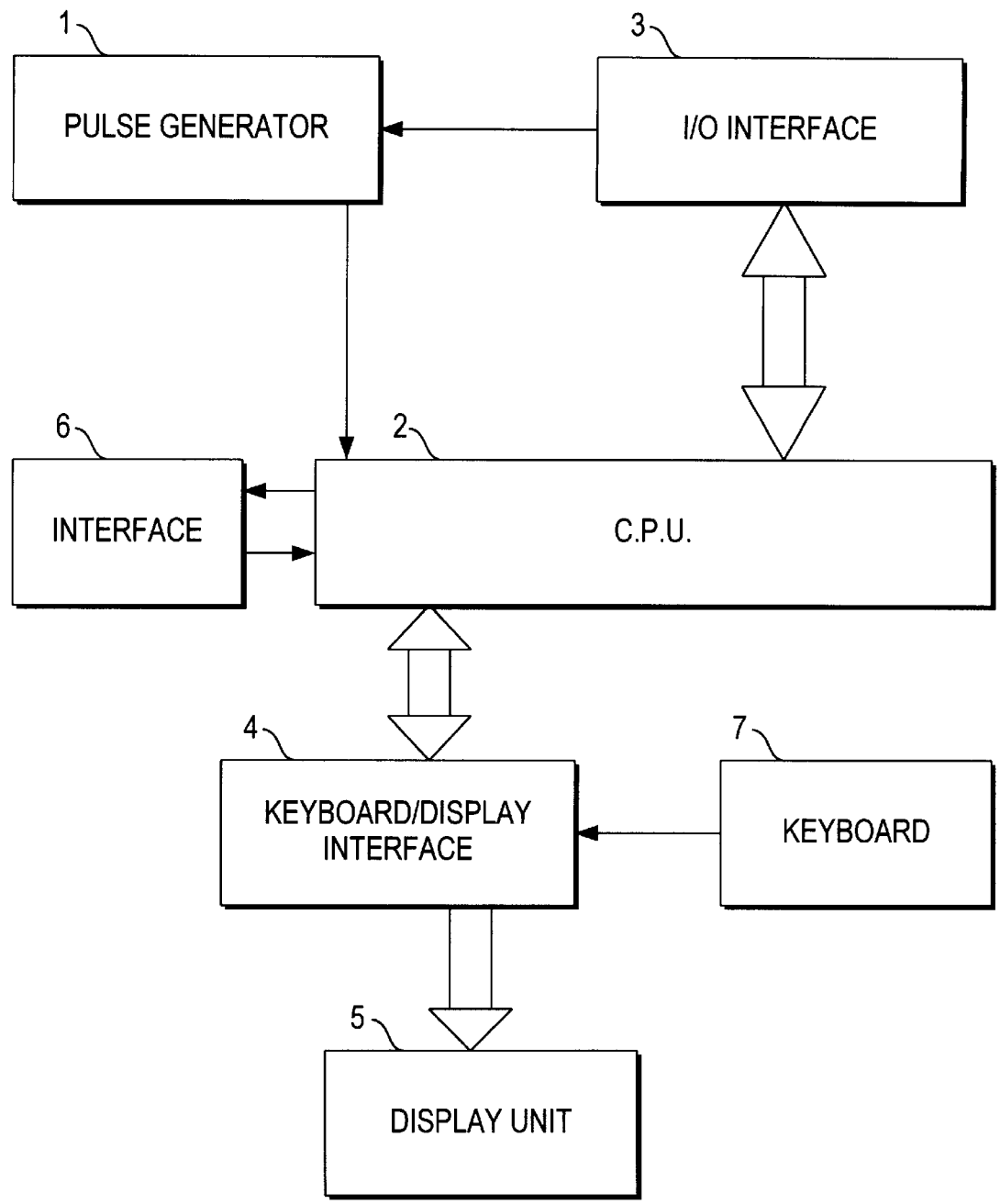
FIG. 1 is a block diagram of the device of the present invention which is useful as a master/slave clock for transmitting and receiving the standard time.

In FIG. 1 of the drawings accompanying this specification the block diagram of the device of the present invention which is useful as a master/slave clock is depicted. In FIG. 1, block 1 is a pulse generator, block 2 is a central processing unit (CPU) with Random Access Memory (RAM) and Externally programmable read only memory (EPROM), block 3 is an input/output (I/O) interface, block 4 is a key board/display interface, block 5 is display unit, block 6 is an interface connected to the modem and block 7 is a key board. Accordingly the present invention provides a device useful as a master/slave clock for transmitting standard time over a telephone network which comprises a pulse generator (1) capable of being synchronized with standard external clock system, the output of the generator (1) being connected directly to and also through an I/O interface (3) to a CPU (2) having RAM and EPROM, the CPU (2) being connected to a key board (7) and to a digital display unit (5) through an interface (4), the said CPU (2) being connected to an interface (6) capable of making the signals compatible for connecting to a telephone modem. The central processing unit used may be a microprocessor such as Intel (8085, 8080, 8086), Motorola (68000).

Figure 2:
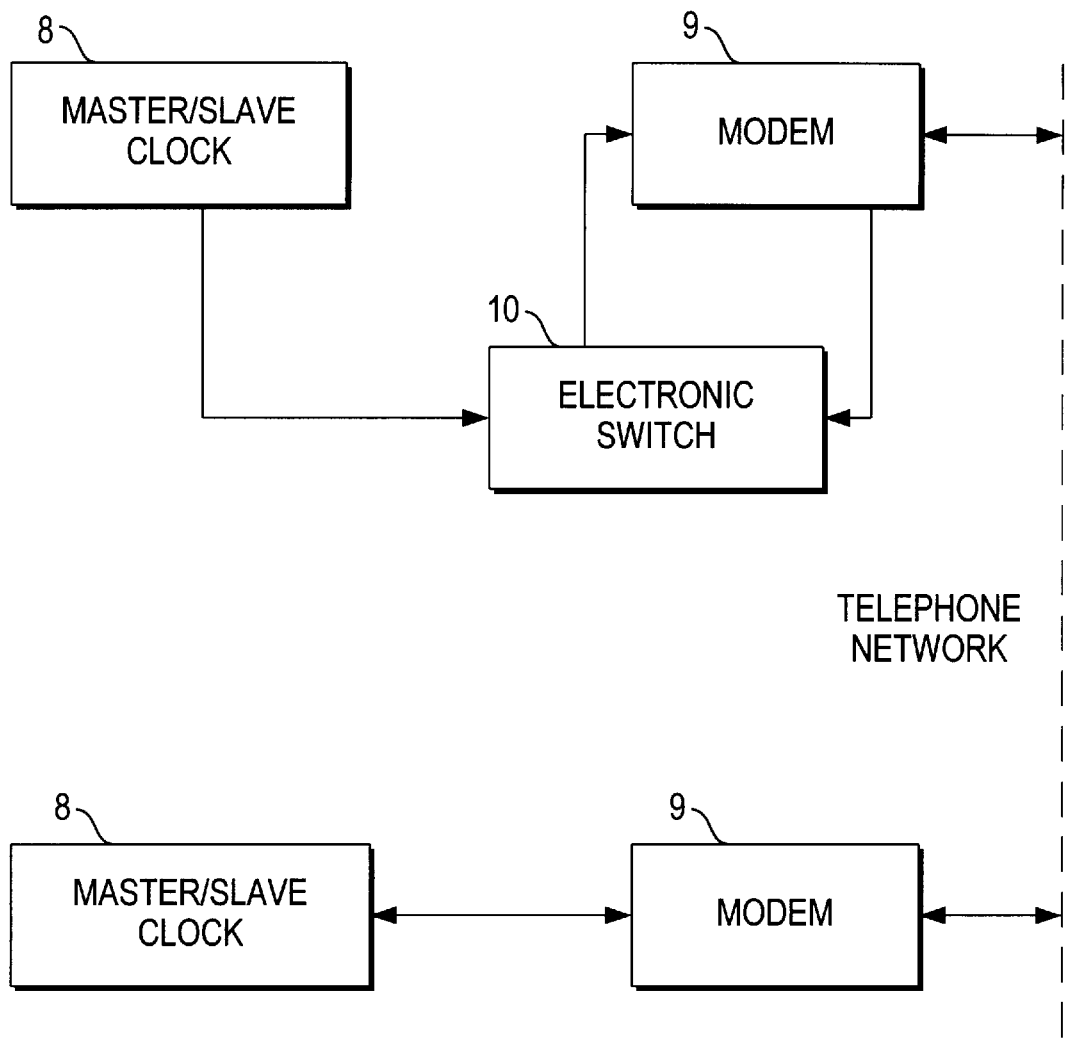
FIG. 2 is a block diagram of the telephone network incorporating the device shown in FIG. 1 for transmitting and receiving the standard time.

In FIG. 2 of the drawings accompanying this specification, the block diagram of the telephone network incorporating the device for transmitting and receiving standard time is shown. In FIG. 2, block 8 depicts the master clock the details of which is shown in FIG. 1 of the drawings, block 9 is a modem, block 10 is an electronic switch. Accordingly the present invention provides a telephone network incorporating the device for transmitting and receiving standard time which comprises a master/slave clock (8) connected to a telephone network through a modem (9) and an electronic switch (10) at the transmitting end, a slave clock at the receiving end being connected to the said telephone network through a modem (9).

The device of the present invention is a microprocessor based system which functions through a software, intimately related to its hardware arrangements. The system is basically comprised of an independent clock system with a display unit. The output of the clock is connected to a modem through RS232C part. In the clock, the oscillator is based on standard crystal (~1 PPM). 1 pps is generated by dividing the oscillator output by the number same as the frequency value of the oscillator. This 1 pps actually drives the interrupt subroutine of the microprocessor software to generate the clock (i.e. hour, minute, second) data and to feed them to the display unit. The system functions in either master (i.e. transmit) mode or receive (i.e. slave) mode.

In receive or slave mode, the system dials a know telephone number through modem either at a predecided time or on command. When the line is successfully connected, the data stream from the transmit/master system starts flowing in. The system accepts the data. On receiving a particular character the phase of second pulse of the system clock can be set. This can be achieved by generating a software pulse on identifying the special character. The software pulse thus generated is used to reset the clock. The clock data stream available from the modem is used to update the current clock data stored in RAM which in turn is used by clock software. After the clock data is "errorlessly" updated, the telephone line is disconnected by a command through Modem. The system can be in master mode when the system is not linked with telephone line.

If the system functions in transmit/master mode, the clock, system, just at the start of the interrupt subroutine, generates the special character virtually coinciding with the phase of the second pulse of the master clock. The master clock can be "constantly" set by external master clock system, if necessary. The system outputs the stream of clock data in a predefined format through RS232C port. This output can be practically linked to the modem when the status of carrier-detect of the modem is ON.

The following example is given by way of illustration of the device of the present invention and it should not be construed to limit the scope of the present invention.

EXAMPLE 1

Format of the Data

When the clock is in the master mode, the master clock sends out data related to current time through the RS232C port in a definite format so that the receiving slave clock can recognize the pattern. The sequence of characters and data those are sent are as follows:

"O", "<CR>", "S", "<CR>", SD, "<CR>", "K", "<CR>", MD, "<CR>", "G", "<CR>", HD, "<CR>"

Items within the " " are characters themselves and SD, MD and HD correspond to two digit data of second, minute and hour respectively. "<CR>" denotes the "command character" carriage return. The arrival of "O" signifies the phase of the second pulse of the master clock, "O" is received by the slave clock by hardware means. So customarily one software pulse through anyone port of ICS255 would be generated immediately after the identification of "O". This software pulse aligns the phasing of 1 pps generation to interrupt RST 6.5 at the receiving end. The technique involved is simple. A crystal oscillator output has to be passed through a frequency divider chain to get the 1 pps signal. In this case the dividing counter is started by the incoming MASTER clock's 1 pps and after pulse shaping, we get a phase shifted 1 pps in the SLAVE clock, "S", "K" and "G" are signature that precedes the second data (SD), minute data (MD) and hour data (HD) respectively. In the case of clock operating in the slave mode, it receives the data stream from the RS232C port. Since the data is transmitted serially and the μp can start intercepting data from any point, the necessity of the signature is felt. That is, when any of this signature is recognized, the following two digits would be assumed to be the corresponding hour, minute or second data. The above data sequence is repeated four times in a second in order to provide enough redundance and confidence in reliability of the data at the receiving end.

The carriage return "<CR>" is not necessary if the receiving end is a slave clock but it is convenient when a computer's internal clock is to be synchronized. However the software is not unduly complicated due to its presence. In order to make the data format universally compatible <CR> is added after each data. The slave takes two sets of data pertaining to current time out of the transmitted five sets of data in a second. It compares the two sets. If any discrepancy is found it throws the whole data and starts afresh.

EXAMPLE 2

1 PPS Generation Unit

The 1 pps is actually generated from a 5 MHz signal. A cascade of frequency divider are used to generate 1 pps from 5 MHz. Here as a frequency divider we have used IC7490 which is a decade counter. The divider chain has the provision of being reset by a software 1 pps and/or hardware 1 pps available from the external source. The software pulse helps in aligning the phase of the in built 1 pps with that of the received 1 pps. This alignment helps in extracting data from the received signal as will be more clarified in the software section. The system has in built 5 MHz crystal oscillator. Here phase lock loop (PLL—chip IC564) has been used instead of simple oscillator. The advantage of using the PLL is the following. If the users have a better frequency source of 5 MHz, it can be fed to input of the PLL to lock the voltage controlled oscillator (VCO) frequency. Thus the generated 1 pps becomes more accurate. In the absence of a better external source, VCO of the PLL would anyway behave as a simple oscillator. The 1 pps generated by the hardware as described above is used to interrupt RST 6.5 of the $\mu$P.

EXAMPLE 3

Microprocessor Related Unit

The system is based on an 8-bit microprocessor. The functional block diagram of the system is shown in FIG. 1 of drawings. The main operation of the microprocessor is in its interrupt mode. The interrupt pulse required to run the software is fed from the 1 pps signal generator as explained in the later section. The microprocessor based clock system is made compatible to other digital systems like computers by the provision of the RS232C port. This port serially transmits data related to time through serial output data (SOD) port of the microprocessor. Through serial input data (SID), it receives data. This port is directly connected to RS232C interface.

The functional block diagram of a teleclock system, shown in FIG. 2 comprises of the following main components:

(i) the 8085 Microprocessor chip
(ii) 8279 Keyboard/Display interface chip
(iii) 8255 I/O interface chip
(iv) RS232C interface chips—1488 and 1489

The RS232C interfacing is done through two pins of the 8085 $\mu$P. These two pins are the serial I/O pins. Since the RS232C is not compatible with TTL logic so we have used the line driver IC1488 and the line receiver IC1489 for interfacing TTL logic with RS232C.

The data out of SOD of $\mu$P 8085 is of TTL logic level. In order to make this TTL logic compatible with RS232C it is converted to RS232C by IC 1488. The output voltage level of the line driver is decided by its power supply.

The received RS232C signal is converted to TTL logic by the IC 1489 and is fed to the line of the $\mu$P 8085. Thus the RS232C is made compatible with the TTL logic using 1488 and 1489 ICs. 8255 is a general purpose I/O interface. It has been configured for only output port. C-low port of 8255 is used for the generation of 1 pps by sofware means.

The 8279 is used for interfacing keyboard/display. This is done by software means. When data is entered through keyboard, it is stored in the internal FIFO (First In First Out) memory and an interrupt signal is generated with each entry. This interrupt signal is used to interrupt RST 5.5 of the 8085 $\mu$P. The software for running the keyboard interface is written in the ISS of the RST 5.5.

The display unit is an eight-unit seven segment LED. These are used to display the current time and the status of the different mode of operation through pre-assigned character.

EXAMPLE 4

Software Details

The software of the teleclock system comprises of the main program and two Interrupt Service Subroutine (ISS) RST 6.5 and RST 5.5.

Figure 3:
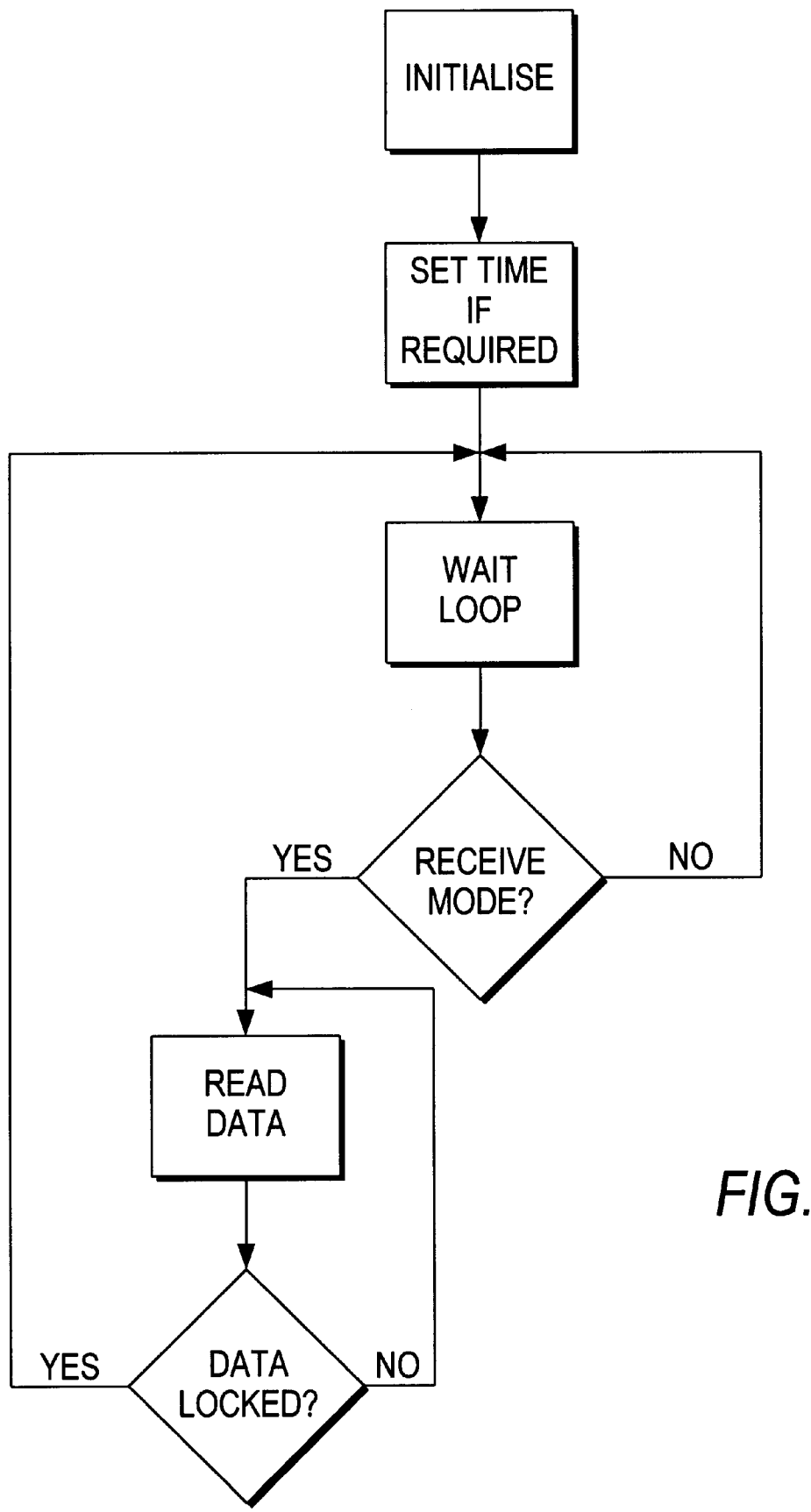
FIG. 3 is a flow chart of the main program.

The main program (see flow chart in FIG. 3) after initialising process enables the interrupts RST 6.5 and RST 5.5 and receives the data from serial port if desired. The initialising process consists of configuring I/O interface 8255, suitably setting the memory areas and setting the current time through the key entry if required. After enabling the interrupts the program lies in a wait loop with a provision of routing to the slave program whenever necessary.

In the slave program first the signature of the incoming data is checked. If the incoming signature is "S" then the following data is stored as the second data. Thus after the identification of the signature of "K" and "G", the minute and hour data are stored respectively. These stored data are used as valid data for time till two consecutive sets of data match exactly. The lock flag is set after the availability of valid data.

Figure 4:
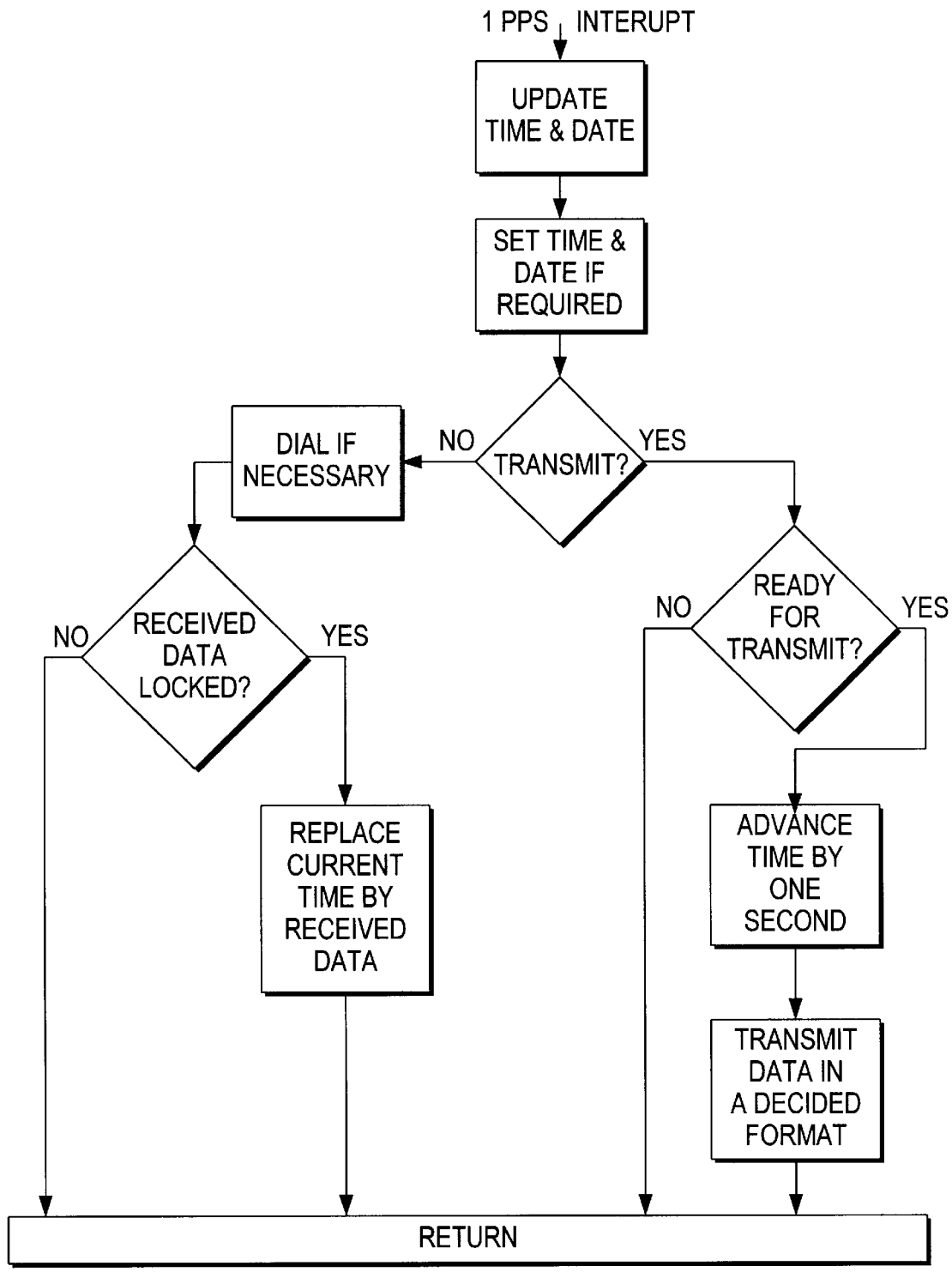
FIG. 4 is a flow chart of the Interrupt Service Routing (RST 6.5).

The basic clock of the system is a software clock run in the interrupt mode through RST 6.5 (see flow chart in FIG. 4). The RST 6.5 is activated by a 1 pps signal generated as described in example 2. The ISS RST 6.5 updates the clock. One may set the time according to the key entry. In this ISS program, the data stream following the transmission scheme (as described in example 1) is outputted through the SOD port when the system operates in the master mode.

The ISS RST 5.5 is executed on entering data through the key board. RST 5.5 ISS actually stores the keyed data in the desired area. The ISS is written in such a way that on pressing the letter "E" the last three data set entered will be displayed on the eight unit 7-segment LED. This has been implemented by the interfacing of $\mu$P 8085 with the 8279. While executing RST 5.5 if 1 pps signal arrives then it jumps to RST 6.5 and the program returns back to ISS 5.5 after executing the RST 6.5.

The main advantages of the present invention are:

1. Time display of Standard Time such as IST corrected up to one second is always available.
2. The time is corrected through normal telephone network in a auto-dialing on command.
3. This is a very simple and inexpensive system.
4. It has independent clock built into the system.
5. The Quartz crystal oscillator of the clock is quite stable to maintain the time within a couple of seconds for a week.
6. The system is compatible with localized telephone network or standard country wide telephone system.
7. The system is compatible with available standard telephone modem. The examples given in the specification are only illustrative in nature and should not be construed to limit the scope of the invention. Similarly the hardware used for device is for illustrative purposes and should not be construed to limit the scope of the invention.

I claim:

1. A device useful as a master/slave clock for transmitting and receiving time data over a telephone network which comprises a pulse generator (1) capable of being synchronized with a standard master external clock system when said device is operating as a master clock, the output of the generator (1) being connected directly to and also through an I/O interface (3) to a CPU (2) having RAM and EPROM, the CPU (2) being connected to a key board (7) and to a digital display unit (5) through a keyboard/display interface (4), the CPU (2) being connected to an interface (6) capable of making the signals compatible for connecting to a telephone modem, said time data comprising phase information and standard time, the phase of a pulse generated by said pulse generator (1) being set by utilizing said phase information received by said device, said phase information being represented by at least one first character sent at a certain time, second data of said standard time being preceded by at least one second character, minute data of said standard time being preceded by at least one third character, and hour data of said standard time being preceded by at least one fourth character.

2. A device as claimed in claim 1 wherein the central processing unit used is a microprocessor.

3. A device as claimed in claim 1 where the EPROM contains the main program for the received mode by enabling the initialising process, setting the time if required, activating the interrupts and thereafter receiving the data checking for locking if required.

4. A device as claimed in claim 1 where the EPROM contains the interrupt service subroutine RST 6.5 for transmit mode by running the clock being activated by a IPPS signal, setting time and date if commanded through key entry, outputting data stream advanced by 1 second through SOD port following transmission scheme if operated in a master mode, the transmission scheme being in a decided format by sending characters and data in a sequence as "O", "<CR>", "S", "<CR>", "SD", "<CR>", "K", "<CR>", "MD", "<CR>", "G", "<CR>", "HD", "<CR>", items within the " " being characters themselves and SD, MD and HD being two digit data of second, minute and hour respectively, "<CR>" denoting the "command character" carriage return, and the arrival of "O" signifying the phase of the second pulse of the master clock.

5. A device as claimed in claim 1 where the EPROM used contains the interrupt service subroutine RST 5.5 for keying in data as required for the operation.

6. A telephone network incorporating the device for transmitting and receiving standard time which comprises a master/slave clock (8) as claimed in claim 1, connected to a telephone network through a modem (9) and an electronic switch (10) as the transmitting end, the electronic switch (10) being located outside of the modem (9), a slave clock at the receiving end being connected to the said telephone network through a modem (9).

* * * * *